United States Patent
Kobayashi et al.

(10) Patent No.: US 6,844,930 B2
(45) Date of Patent: Jan. 18, 2005

(54) SPECTROPHOTOMETER

(75) Inventors: Tomoyuki Kobayashi, Hachioji (JP); Takeo Yamada, Yokohama (JP)

(73) Assignee: Nireco Corporation, Tokyo (JP)

(*) Notice: Subject to any disclaimer, the term of this patent is extended or adjusted under 35 U.S.C. 154(b) by 234 days.

(21) Appl. No.: 10/061,864

(22) Filed: Jan. 31, 2002

(65) Prior Publication Data

US 2002/0131044 A1 Sep. 19, 2002

(51) Int. Cl.⁷ .............................. G01J 3/42; G01N 21/25
(52) U.S. Cl. ...................... 356/319; 356/326; 356/416
(58) Field of Search ............................... 356/319, 326, 356/416

(56) References Cited

U.S. PATENT DOCUMENTS

| | | | | |
|---|---|---|---|---|
| 4,054,389 A | * | 10/1977 | Owen | 356/419 |
| 4,833,332 A | * | 5/1989 | Robertson et al. | 356/417 |
| 5,144,498 A | * | 9/1992 | Vincent | 356/419 |
| 5,272,518 A | * | 12/1993 | Vincent | 356/405 |
| 5,872,655 A | | 2/1999 | Seddon et al. | |
| 6,057,925 A | | 5/2000 | Anthon | |
| 6,535,284 B1 | * | 3/2003 | Hajduk et al. | 356/367 |
| 6,630,999 B2 | * | 10/2003 | Shroder | 356/326 |

FOREIGN PATENT DOCUMENTS

JP        05-322653 A       12/1993

\* cited by examiner

Primary Examiner—Zandra V. Smith
(74) Attorney, Agent, or Firm—Frishauf, Holtz, Goodman & Chick, P.C.

(57) ABSTRACT

A spectrophotometer is provided which includes: (i) a Linear Variable Filter, (ii) a linear sensor or a two-dimensional image sensor, and (iii) at least one fiber optic plate that is disposed between the Linear Variable Filter and the linear sensor or two-dimensional image sensor, and that transfers light separated into spectral components and outgoing from the Linear Variable Filter to the linear sensor or two-dimensional image sensor. With this structure, a compact spectrophotometer can be obtained which has an excellent wavelength resolution, accuracy, and light transfer ratio, and which can conduct wavelength spectral measurements at high speed and with high accuracy.

5 Claims, 11 Drawing Sheets

Fig. 11        Prior Art
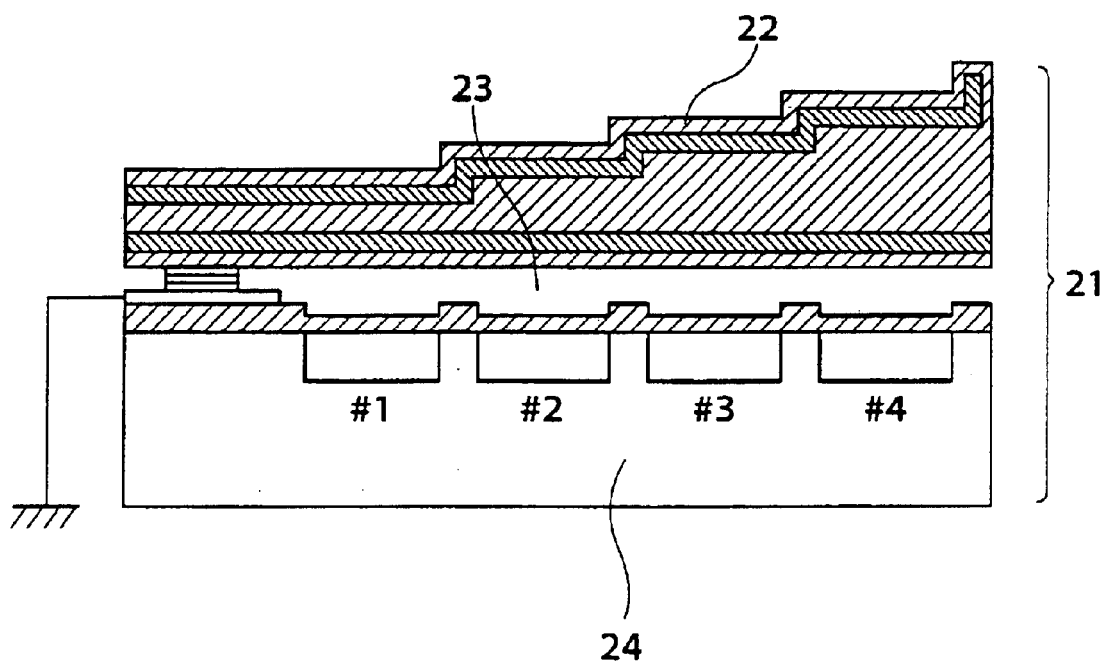
Fig. 12        Prior Art
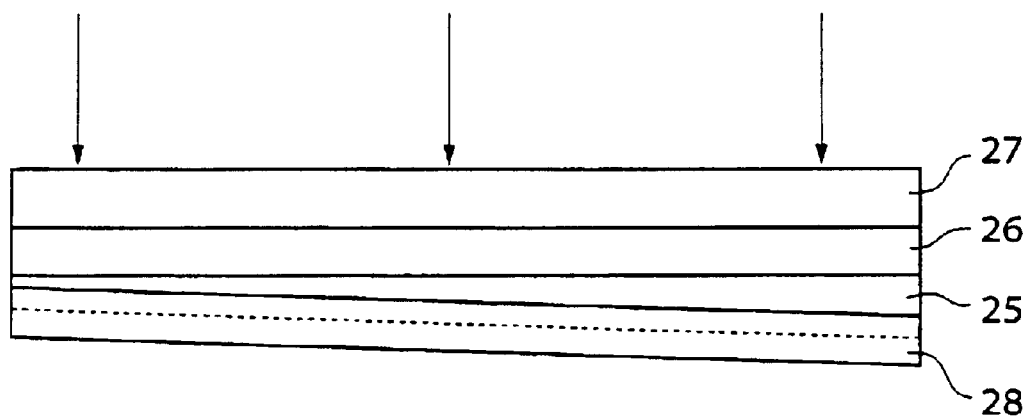

SPECTROPHOTOMETER

BACKGROUND OF THE INVENTION

1. Field of the Invention

The present invention relates to a compact spectrophotometer that can conduct spectrophotometry, without using a prism or a diffraction grating.

2. Description of the Related Art

The conventional method for measuring spectral intensity comprises guiding light along directions which differ for each wavelength by using a prism or a diffraction grating, illuminating a linear sensor or the like, and measuring the output from each element of the linear. However, when a prism or diffraction grating is used, a certain space is necessary to guide and separate spectral components of the light along the directions which differ depending on the wavelength. Accordingly, an increased size of spectrophotometers has been a problem. Another problem has been that since the light to be analyzed passes through a slit when guided to a prism or diffraction grating, the quantity of light is decreased and the accumulation time required by the linear sensor is extended, which has made it difficult to conduct fast measurements.

Several methods using a transmitted wavelength variable filter (referred to as a Linear Variable Filter or LVF hereinbelow) have been suggested and used in practice to resolve the above-described problems. One such method is disclosed in Japanese Patent Application No. H05-322653 and is illustrated in FIG. 11.

As shown in FIG. 11, a linear sensor 21 is equipped with a Linear Variable Filter 22 which is formed fixedly on a linear sensor 24 so as to sandwich a resin 23 such as an organosilicon compound. The Linear Variable Filter 22 comprises an interference filter in which a transparent electrically conducted film is formed with a thickness differing depending on location, as shown in FIG. 11, and therefore the transmitted wavelength differs depending on location.

Changing successively the thickness of the transparent electrically conductive film formed on the linear sensor 24 correspondingly to unit elements thereof provides for spectral separation of light of different wavelength bands and reception thereof by unit elements of linear sensor 24. With such a method, a spectral film and a photoelectric converter are integrated and a size is obtained which is about the same as that of a usual linear sensor. For this reason, such linear sensors featuring small size and weight and low cost have been marketed.

A spectrophotometer using a Linear Variable Filter of another system is disclosed in U.S. Pat. No. 5,872,655, and has also been marketed. In the Linear Variable Filter used therein, a dielectric material with a low dielectric constant and a dielectric material with a high dielectric constant are formed alternately as films on a substrate in vacuum by using an IAD (Ion Assisted Deposition) method, the number of layers being no less than 200. Changing the film thickness in the longitudinal direction of the substrate provides for characteristic such that the transmitted wavelength changes linearly according to the position in the longitudinal direction.

FIG. 12 illustrates the structure of the system disclosed in U.S. Pat. No. 5,872,655. As shown in FIG. 12, Linear Variable Filter 25 is formed as a film on a substrate 26 by the above-mentioned IAD method. A bandpass filter 27 is attached to the opposite side of substrate 26. The Linear Variable Filter 25 is attached to a linear sensor 28, and if light falls from the side of bandpass filter 27, the wavelength of the light that passed through the Linear Variable Filter 25 will differ depending on position, the light of different wavelength will fall on elements of linear sensor 28, and a spectrophotometer in which a spectral film and a photoelectric converter are integrated can be realized.

Another spectrophotometer using a Linear Variable Filter of a type different from the above-described types is disclosed in U.S. Pat. No. 6,057,925, and has also been marketed. In this spectrophotometer, an optical system forming an upright, noninverted image is inserted between a Linear Variable Filter and a linear sensor. As a result, light beams separated into spectral components and propagating from the Linear Variable Filter form an image on the linear sensor, and a GRIN (Gradient Index) lens or Micro Lens Array is used as a compact system for forming the upright, noninverted image.

FIG. 13 illustrates a structure using a GRIN lens. In this structure, transparent glass sheets 32, 33 are attached to a Linear Variable Filter 31 and then a GRIN lens 34 is adhesively bonded and integrated therewith.

The sensor surface of a linear sensor 36 is arranged so as to be in a position at a prescribed distance from the GRIN lens 34 via a transparent glass sheet 35. The thickness of transparent glass sheet 33 and the distance L between the GRIN lens 34 and the photosensitive surface of linear sensor 36 serve as conditions for forming the upright, noninverted image.

However, the system disclosed in Japanese Patent Application Laid-open No. H05-322653 which is illustrated in FIG. 11, and the method disclosed in U.S. Pat. No. 5,872,655 which is illustrated in FIG. 12 have the following drawbacks. Namely, in both cases, structures are obtained in which a Linear Variable Filter is attached to a linear sensor. As a result, multiple reflections occur between the Linear Variable Filter and the linear sensor and the spectral characteristic is degraded.

The method disclosed in U.S. Pat. No. 6,057,925 illustrated in FIG. 13 resolves those problems, but another problem is associated therewith. Namely, the GRIN lens is composed of a total of 28 rod-like lenses 37 arranged in two rows as shown in FIG. 14. Therefore, if a surface image such as that of the Linear Variable Filter 31 is projected, a synthesized image produced by 28 rod-like lenses is formed on the linear sensor 36. Therefore, strictly speaking, 28 peak distortions appear in the output of linear sensor 36. As a result, even if the accuracy of the position of the spectra is increased the accuracy of the magnitude of the output is decreased.

In particular, differentiation of optical spectra is often conducted in the application field of spectrophotometers. However, in such cases, the inaccurate magnitude of output results in much noise and the accuracy of values after the differentiation is degraded. It therefore becomes impossible to conduct differentiation from the optical spectra.

Moreover, though the image is upright and noninverted, since the image is formed by 28 rod-like lenses with a small surface area and the image forming distance is much larger than that in the above-mentioned conventional systems, the light transfer ratio decreases to no more than 2–3%. As a result, the capability of shortening the scanning period of linear sensor 35 and measuring high-speed phenomena provided for by the utilization of a large quantity of light, which is inherent to spectroscopes with a Linear Variable Filter, is lost.

SUMMARY OF THE INVENTION

It is an object of the present invention to resolve the drawbacks inherent to the above-described conventional spectrophotometers and to provide a compact spectrophotometer which has an excellent wavelength resolution, accuracy, and light transfer ratio, and which can conduct spectrophotometry at high speed and with high accuracy.

In order to achieve these objects, the present invention provides a spectrophotometer comprising [1] a Linear Variable Filter, [2] a linear sensor or a two-dimensional image sensor, and [3] at least one fiber optic plate that is disposed between the Linear Variable Filter and the linear sensor or two-dimensional image sensor, and that transfers light separated into spectral components and outgoing from the Linear Variable Filter to the linear sensor or two-dimensional image sensor.

In the structure of the present invention, the light spatially separated into spectral components by the Linear Variable Filter is transferred to a linear sensor or two-dimensional image sensor via a fiber optic plate (also referred to as a "FOP"). As used herein, the term "Linear Variable Filter" means a filter through which light of changing wavelength passes depending on the incidence position.

The fiber optic plate is obtained by assembling together a large number of optical fibers having a small cross sectional area (usually, a regular hexagon with the largest diagonal line length of 6–25 $\mu$m) and has a structure such that light incident upon one optical fiber is entirely reflected at the boundary of a core and a clad of this optical fiber, then propagates inside the optical fiber, and reaches the other end surface. Such a structure is described in Fiber Optic Plates and Their Applications published on Sep. 28, 1990, in Television Gakkai Gijutsu Hokoku.

Utilizing a fiber optic plate as light transfer means makes it possible to guide the light outgoing from a Linear Variable Filter to the location of a linear sensor or two-dimensional image sensor corresponding to the light exit position of the Linear Variable Filter, without diffusion and in a state with a low light absorption ratio. As a result, a spectrophotometer with excellent wavelength resolution, accuracy, and light transfer ratio can be obtained. Therefore, sufficient response can be obtained even at a high scanning speed of the linear sensor or two-dimensional image sensor, and fast measurements can be conducted. In addition, differentiation can be conducted during signal processing because no noise is caused by the dependence of transfer efficiency on location during light transfer.

In the present invention, in order to improve the transfer efficiency of light and prevent diffusion, it is preferred that the spectral film of the Linear Variable Filter and the fiber optic plate be in intimate contact. The reason is that because the light outgoing from the Linear Variable Filter is diffused light, if the spectral film and fiber optic plate are separated from each other, the light that was separated into spectral components is mixed again when it is incident on the fiber optic plate and the wavelength resolution is degraded.

It is also preferred that the fiber optic plate be in intimate contact with the linear sensor or two-dimensional image sensor. However, since the structure becomes complex, they are preferably arranged close to each other, sandwiching a transparent substance such as a transparent resin or the like.

In the present invention, it is also preferred that the numerical aperture of the fiber optic plate be no more than 1.0.

The present invention also includes spectrophotometers with a structure in which a gap is present between the spectral film of the Linear Variable Filter and the fiber optic plate and/or between the fiber optic plate and the linear sensor or two-dimensional image sensor and a structure in which a gap is present between the fiber optic plate and the linear sensor or two-dimensional image sensor.

Accordingly, the diffusion of light occurs and the wavelength resolution is sometimes decreased, as described above, when light propagates in those gaps from the spectral film of the Linear Variable Filter to the fiber optic plate and when light propagates from the fiber optic plate to the linear sensor or two-dimensional image sensor.

Even in such cases, if the numerical aperture of the fiber optic plate is not more than 1.0, the diffused light cannot pass inside the fiber optic plate and the spread of light outgoing from the fiber optic plate is decreased. As a result, a reduction of wavelength resolution can be prevented.

It is even more preferred that the numerical aperture of the fiber optic plate be not more than 0.35. In such case, the wavelength resolution of the usually required accuracy can be guaranteed even if the optical fiber plate is disposed between the usual commercial Linear Variable Filter and linear sensor or two-dimensional image sensor.

Furthermore, in the present invention, it is preferred that an optical fiber plate with a numerical aperture less than 1.0 be added in intimate contact with the incidence side of the Linear Variable Filter.

With certain structures of the Linear Variable Filter, the target wavelength resolution characteristic sometimes cannot be obtained if the incident light enters obliquely. It is possible to prevent the light which is incident obliquely onto the Linear Variable Filter from being transferred to the linear sensor or two-dimensional image sensor by disposing the fiber optic plate between the Linear Variable Filter and linear sensor or two-dimensional image sensor, but the results are not always sufficient.

In such cases, if the fiber optic plate with a numerical aperture of less than 1.0 is added in intimate contact with the incidence side of the Linear Variable Filter, an angle of light which is incident obliquely onto the Linear Variable Filter can be restricted and a target wavelength resolution can be obtained.

In this case, the numerical aperture of the fiber optic plate that has been added is preferably no more than 0.35. With such a numerical aperture, the wavelength resolution of the usually required accuracy can be guaranteed even if the optical fiber plate is disposed between the usual commercial Linear Variable Filter and linear sensor or two-dimensional image sensor.

Furthermore, in the present invention, it is preferred that the fiber optic plate disposed between the Linear Variable Filter and linear sensor or two-dimensional image sensor be composed of a fiber optic plate with a numerical aperture of 1.0 and a fiber optic plate with a numerical aperture of no more than 0.35, those fiber optic plates being in intimate contact with each other.

Fiber optic plates with a small fiber diameter of 3 $\mu$m and 6 $\mu$m are presently marketed as fiber optic plates with a numerical aperture (NA) of 1.0. On the other hand, the minimum diameter of fibers in the fiber optic plates with a numerical aperture of 0.35 $\mu$m that are presently marketed is 25 $\mu$m. When the size of one pixel of a linear sensor is 50×2500 $\mu$m, such fiber diameters of fiber optic plates cause no problem.

However, pixels in the recent two-dimensional CCDs are getting smaller year after year and the most recent types of them have a size of about 15×15 μm. When such CCDs are used to miniaturize the device, if a fiber optic plate with a small numerical aperture is employed, one fiber will cover two pixels and wavelength resolution will decrease.

In order to prevent such an effect, an assembly of a fiber optic plate with a large numerical aperture, that is, NA=1, and a fiber optic plate with a numerical aperture of no more than 0.35 is preferably used. When the former optical fiber plate is installed on the linear sensor or two-dimensional image sensor side, coverage of two pixels with one fiber will be eliminated and the aperture angle will be restricted. Therefore, the decrease in wavelength resolution can be prevented.

On the other hand, when a linear sensor or two-dimensional image sensor with pixels of a large size is used, if the latter optical fiber plate is installed on the linear sensor or two-dimensional image sensor side, the output from the Linear Variable Filter can be taken out upon breaking down into small components.

Furthermore, in the present invention, it is preferred that the fiber optic plate arranged between the Linear Variable Filter and the linear sensor or two-dimensional imaging sensor be a tapered fiber optic plate.

The tapered fiber optic plate is a fiber optic plate in which the cross section areas of both end surfaces where the light incomes and outgoes are different. As a result, the light incident on the portion with a large surface area is collected in the portion with a small surface area, and the light incident on the portion with a small surface area is diverged in the portion with a large surface area.

If a tapered fiber optic plate is used, even if the size of the Linear Variable Filter is different from that of the linear sensor or two-dimensional image sensor, the light reception surfaces of both components can be used to a maximum.

Moreover, in the present invention, it is preferred that the side surface of the Linear Variable Filter be treated so as to obtain a low reflectance ratio.

Since most Linear Variable Filters use interference of a multilayer film, light undergoes repeated multiple reflections therein. If at this time the light incident upon the side surface of the Linear Variable Filter is reflected, the optical path length of the light will differ from the designed value, causing decrease of wavelength resolution. The decrease of wavelength resolution thus caused can be prevented by providing the side surface of the Linear Variable Filter with a low reflectance ratio, for example, by applying an anti-reflection film to the side surface of the Linear Variable Filter.

BRIEF DESCRIPTION OF THE DRAWINGS

FIG. 11 illustrates the structure of a conventional linear sensor equipped with a Linear Variable Filter;

FIG. 12 illustrates the structure of another conventional linear sensor equipped with a Linear Variable Filter;

DESCRIPTION OF THE PREFERRED EMBODIMENTS

Preferred embodiments of the present invention will be described below with reference to the drawings. However, the description of the preferred embodiments is not intended to place any limitation on the scope of the present invention as recited in the appended claims.

Figure 1:
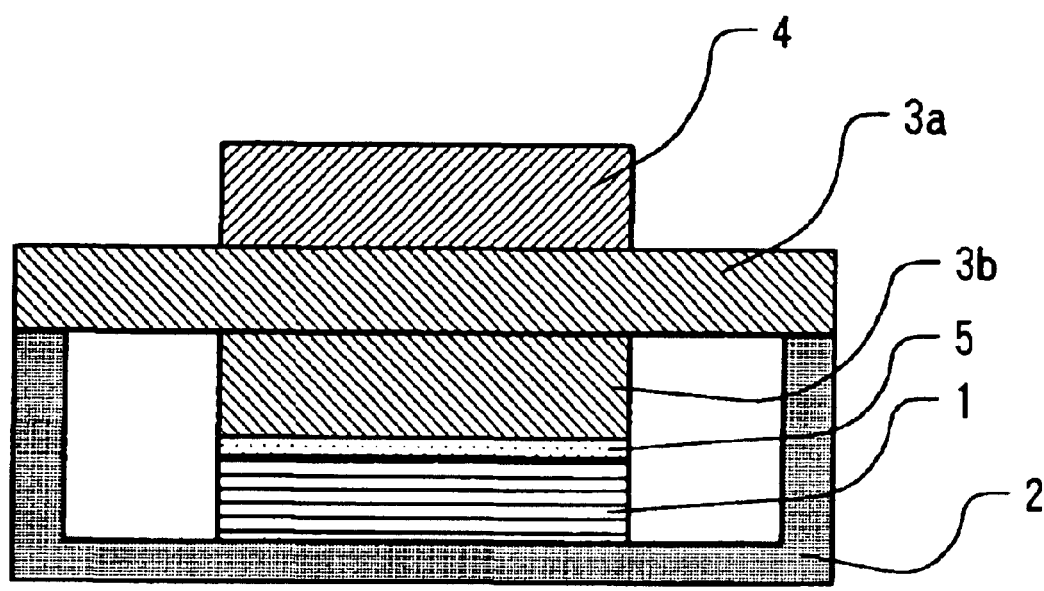
FIG. 1 is a schematic view illustrating the structure of a spectrophotometer according to a first embodiment of the present invention.

FIG. 1 is a schematic view illustrating the structure of a spectrophotometer according to a first embodiment of the present invention. Fiber optic plates 3a, 3b are disposed as shown in FIG. 1 on a sensor package 2 of a linear sensor 1, and a Linear Variable Filter 4 is provided thereabove in intimate contact with the fiber optic plate 3a. The distance between the linear sensor 1 and fiber optic plate 3b is about 0.01 mm and the space therebetween is filled with a transparent resin 5. In this embodiment, the numerical aperture (NA) of fiber optic plates 3a, 3b is 1.

The fiber optic plate is divided into two plates 3a, 3b in order to use the fiber optic plate 3a in place of a surface cover glass of sensor package 2 of linear sensor 1. When it is not necessary, one fiber optic plate may be used, or plates 3a and 3b may be integrally molded.

Of the light incident on the Linear Variable Filter 4 from above, as shown in FIG. 1, only the light with a wavelength determined by the position of incidence on Linear Variable Filter 4 is transmitted, separated into spectral components according to the position of Linear Variable Filter 4, guided by fiber optic plates 3a, 3b, passed through the transparent resin 5, and caused to fall on corresponding pixels of linear sensor 1. Therefore, spectral measurements can be conducted by processing the outputs of pixels of linear sensor 1.

Even though the numerical aperture of fiber optic plates 3a, 3b is 1, since the Linear Variable Filter 4 is in intimate contact with fiber optic plate 3a, there is no diffusion of light therebetween, but diffusion of light, though very small, does occur between the fiber optic plate 3b and linear sensor 1. However, this is not a serious problem because the distance therebetween is about 0.01 mm. In this embodiment, the light transfer ratio from the Linear Variable Filter 4 to the linear sensor 1 is about 60–70% which is clearly not inferior to that of conventional examples in which the Linear Variable Filter was in close proximity to the linear sensor.

Figure 2:
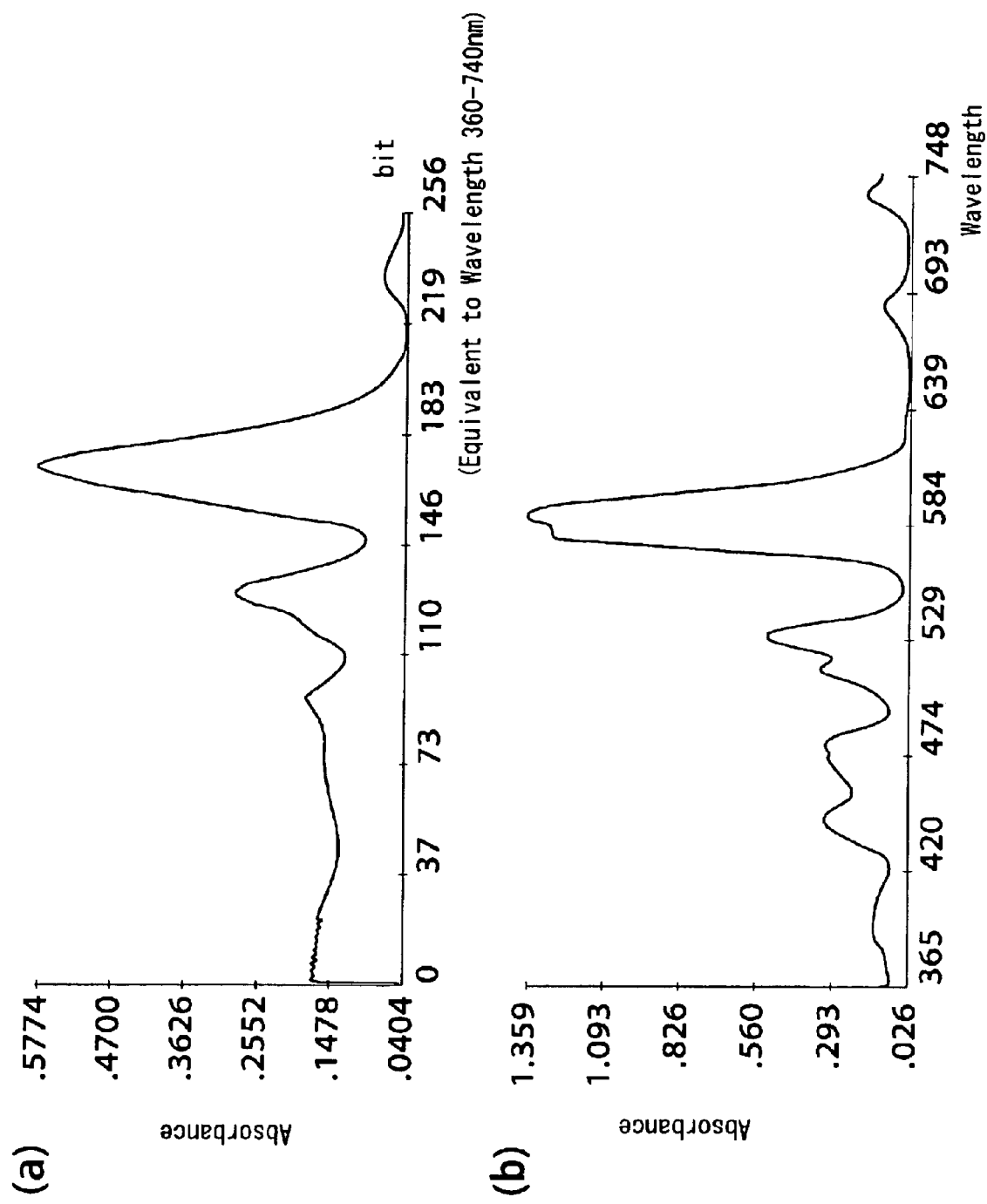
FIG. 2(a) illustrates an absorbance characteristic of a didymium filter in the case where a fiber optic plate with a numerical aperture of 1 is used in the embodiment illustrated in FIG. 1.
FIG. 2(b) illustrates an absorbance characteristic of a didymium filter in the case of a conventional spectrophotometer using a GRIN lens, for comparison purposes.

The absorbance characteristic of a didymium filter for spectral performance evaluation is shown in FIGS. 2(a) and 2(b). FIG. 2(a) relates to the above-described embodiment and FIG. 2(b) relates to a conventional spectrophotometer using a GRIN lens that was selected as an object of comparison. In FIGS. 2(a) and 2(b), a wavelength or the number of bits of the linear sensor corresponding thereto is plotted against the abscissa and the absolute value of the common logarithm of $(I_0-I)/I_0$ which represents the absorbance is plotted against the ordinate. Here, $I_0$ stands for the intensity of incident light and I stands for the intensity of outgoing light. FIGS. 2(a) and 2(b) demonstrate that as the maximum peak value (that is, the absorbance) becomes higher, the spectral characteristic (resolution) becomes better.

As shown FIGS. 2(a) and 2(b), the absorbance of the GRIN lens system in the vicinity of 580 nm is as high as 1.35, whereas in the present embodiment it is about 0.58. In this connection, the scanning period at this time is 13 msec in the case of the GRIN lens system, whereas in the case of the first embodiment of the present invention it is as short as 1 msec.

Consideration of causes leading to decrease in absorbance in the case of the first embodiment of the present invention shows that the only cause is the dispersion of light within a 0.01 mm space between the fiber optic plate 3b and linear sensor 1.

Thus, an aperture angle (NA) of fiber optic plate equal to 1 means that light with an angle of incidence of 0–90° can pass. Therefore, if a component of diffuse light with a large angle of incidence is present, light with a large angle will go out at this angle even is the gap is as small as 0.01 mm. The remaining light that is not absorbed at the surface of linear sensor 1 is reflected and further diverged. This reflected light is partially reflected on the bottom surface of fiber optic plate 3b and partially penetrates into the fiber optic plate. The reflected light again falls on the surface of linear sensor 1 and reflection thereof is repeated with absorption, but the position thereof is greatly displaced in the left-right direction.

When the light incident onto the fiber optic plate is incident in a position far from the portion where light departs from the Linear Variable Filter, this light is not transmitted. Therefore, it is once again reflected by the surface of Linear Variable Filter 4 and again falls on the different surface of linear sensor 1 via the fiber optic plates 3a, 3b. In other words, if the departure angle of diffuse light is large, it will undergo repeated multiple reflections, while being absorbed by the sensor surface. Therefore, when viewed as the output of linear sensor 1, it will become a spread output. In other words, the wavelength resolution will be decreased. In order to prevent such dispersion of light, a fiber optic plate with a numerical aperture (NA) of less than 1.0 may be used as at least one of fiber optic plates 3a, 3b.

Figure 3:
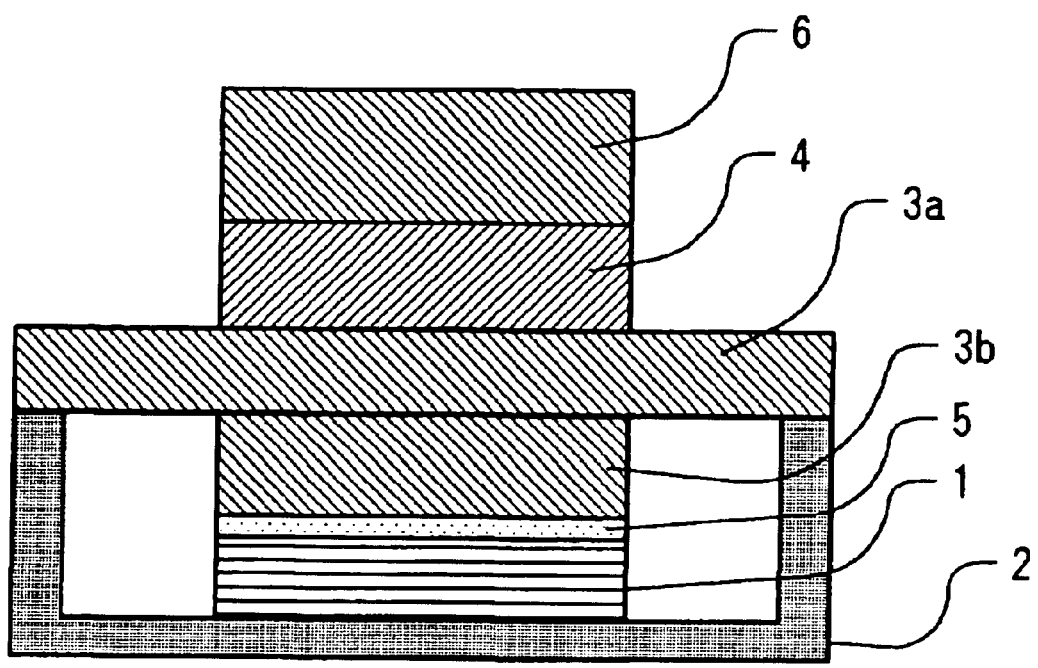
FIG. 3 is a schematic view illustrating the structure of a spectrophotometer according to a second embodiment of the present invention.

FIG. 3 is a schematic view illustrating the structure of a spectrophotometer according to a second embodiment of the present invention. The only difference between this embodiment and the embodiment shown in FIG. 1 is that a fiber optic plate 6 with a numerical aperture (NA) of 0.35, which is a new component, is brought in intimate contact with the upper surface of Linear Variable Filter 4.

Figure 4:
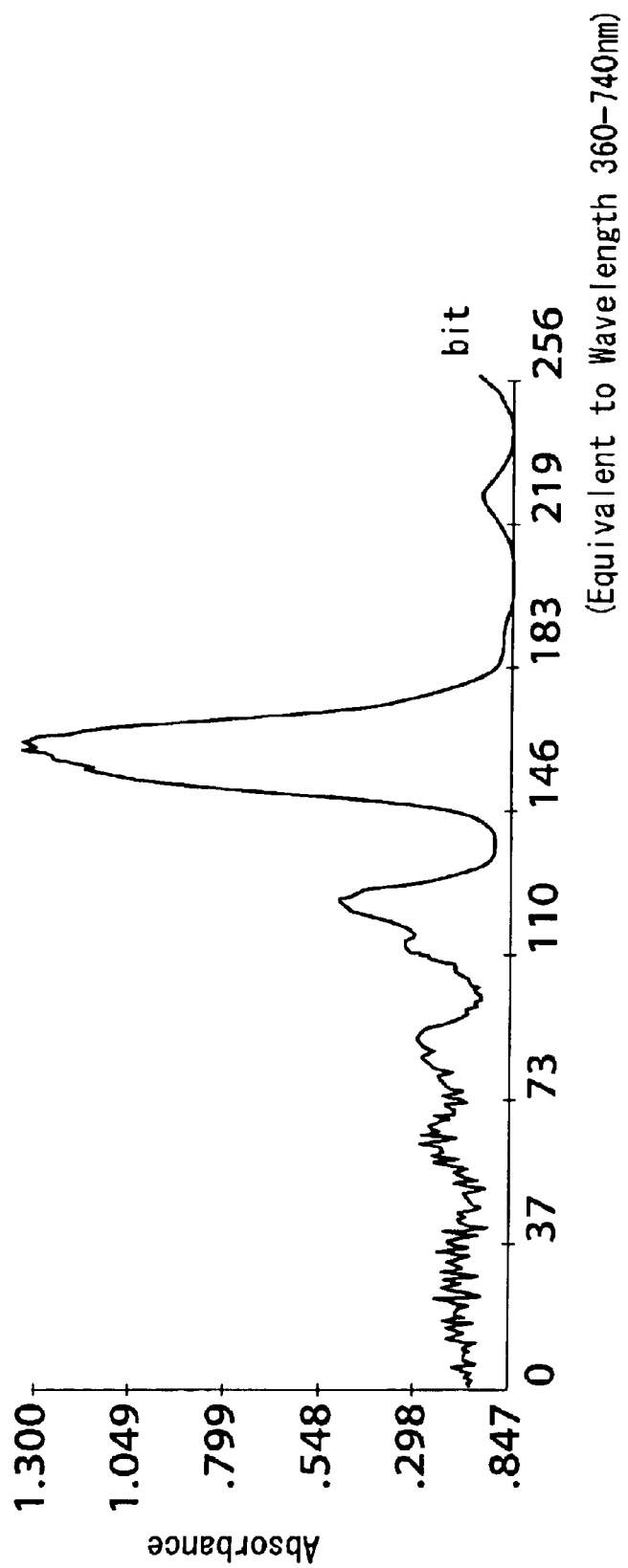
FIG. 4 illustrates an absorbance characteristic of a didymium filter in the embodiment illustrated in FIG. 3.

A light absorption characteristic of the didymium filter in this embodiment is shown in FIG. 4. The absorbance is increased to 1.3, and assumes a value close to that in case of a spectrophotometer using a GRIN lens. This is because the numerical aperture is decreased in the respective zones due to the installation of fiber optic plate 6, and the numerical aperture of light outgoing from the fiber optic plate 3b is also decreased accordingly. Thus, it is clear that in the embodiment shown in FIG. 3, a spectral characteristic can be obtained which is almost identical to that of a spectrophotometer using a GRIN lens.

Figure 5:
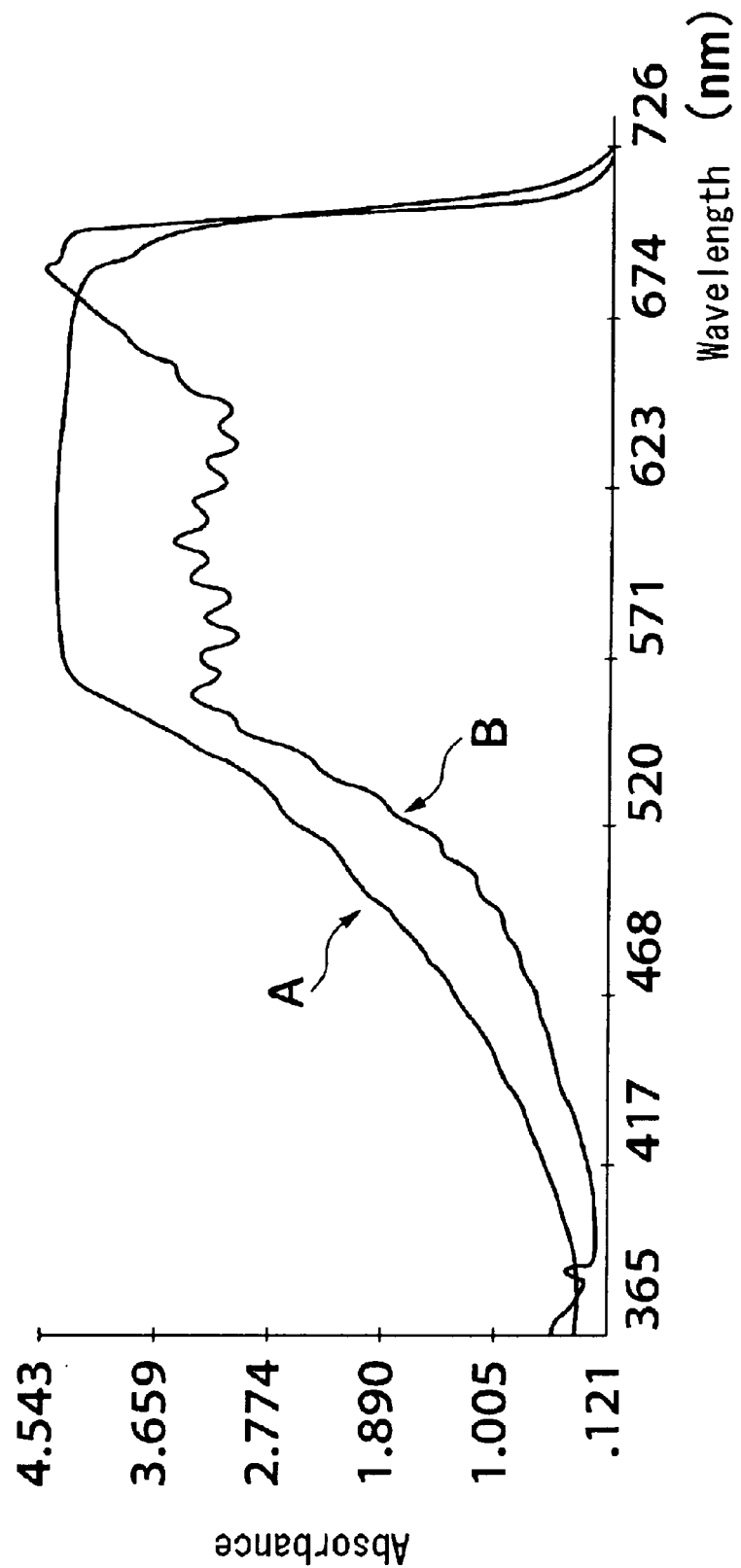
FIG. 5 illustrates an output pattern of the linear sensor in the embodiment illustrated in FIG. 3.

FIG. 5 shows an output pattern of linear sensor 1. In FIG. 5, A represents the results relating to the embodiment shown in FIG. 3 and B represents the results obtained with the spectrophotometer using a GRIN lens, these results being shown for comparison. A spectral range in this case is 360–740 nm, and the number of elements in the linear sensor is 256. The data shown in FIG. 5 makes it clear that in the embodiment shown in FIG. 3, the output per each 1.5 nm changes very smoothly and the transfer of light from Linear Variable Filter 4 to linear sensor 1 is not distorted. By contrast, in the spectrophotometer using a GRIN lens, a large number of fine peaks and valleys have appeared owing to light transfer distortions caused, as described above, by the light transfer elements.

Thus, it is clear that by using a fiber optic plate with a small numerical aperture (NA) such as 0.35, greatly increased resolution and accuracy of spectral wavelength of a spectral sensor having a Linear Variable Filter can be obtained. With the waveform shown in FIG. 5, differentiation used, for example, in multivariate analysis can be conducted.

Figure 6:
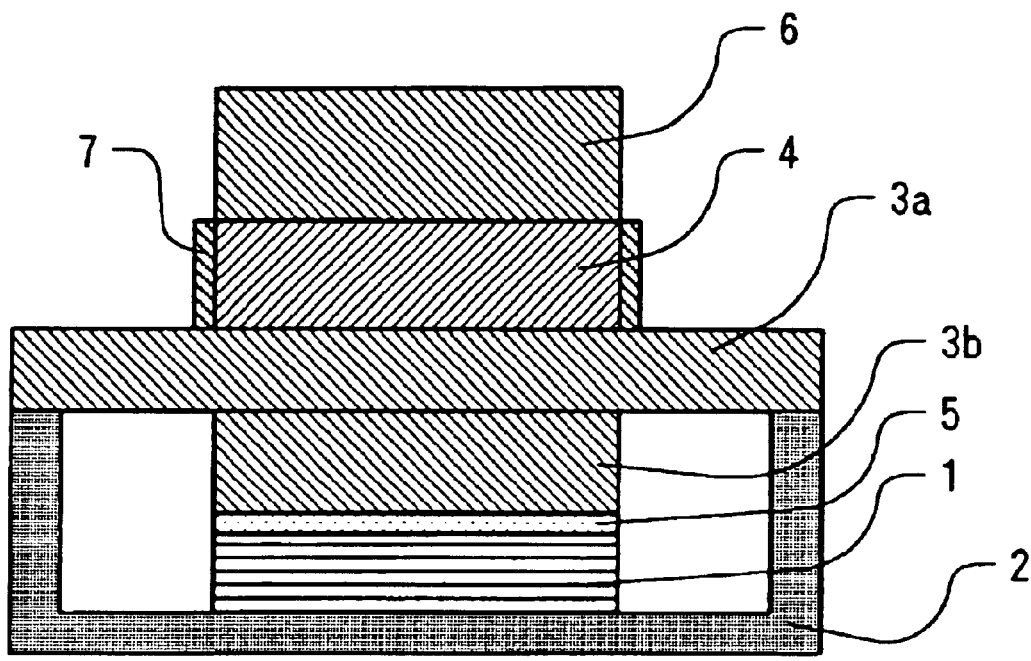
FIG. 6 is a schematic view illustrating the structure of a spectrophotometer according to a third embodiment of the present invention.

FIG. 6 is a schematic view illustrating the structure of a spectrophotometer according to a third embodiment of the present invention. The only difference between this embodiment and the embodiment shown in FIG. 3 is that an anti-reflection film 7 is provided on the side surface of fiber optic plate 4. Thus, in this embodiment, incidence of diffuse light on linear sensor 1 is more fully prevented.

Figure 7:
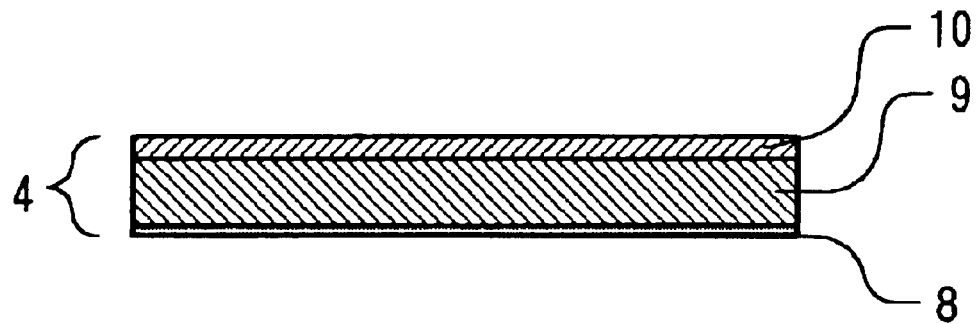
FIG. 7 illustrates an example of the structure of a Linear Variable Filter.

FIG. 7 illustrates the structure of Linear Variable Filter 4. An LVF film 8 is formed on a LVF substrate 9, and then a bandpass filter 10 is attached to the opposite side of LVF substrate 9. In this state, it is cut, for example, to 12.5 mm×2.5 mm. Test results obtained by the inventors demonstrated that the cut surface is the secondary cause of generation of the diffused light.

This is explained as follows. In the embodiment shown in FIG. 3, since the aperture angle of fiber optic plate 6 is 0.35, light that passes through the fiber optic plate 6 has an angle of incidence within 20 degrees. Of this light, the light that does not pass through the LVF film 8 is reflected. The reflected light is partially reflected by the bandpass filter 10 and reflection inside the Linear Variable Filter 4 is repeated. A portion of light that undergoes repeated reflections at this time is incident upon the cut surface. If the reflection on this surface is made to be a diffuse reflection, the angle of incidence of light incident upon the LVF film 8 of Linear Variable Filter 4 is more than 20 degrees and the light reaches the linear sensor 1 via the fiber optic plates 3a, 3b. The quantity of this light is rather small, but it causes the decrease in spectral accuracy. In particular, elements on both ends of linear sensor 1 were found to be especially easily affected.

In the case of the third embodiment, in order to prevent this effect, an anti-reflection film 7 coated with an absorbing agent is provided on the cut surfaces on the four surfaces of Linear Variable Filter. As a result, the incidence of diffuse light with an angle of no less than about 20 degrees onto the linear sensor can be prevented and spectral accuracy is further increased.

Figure 8:
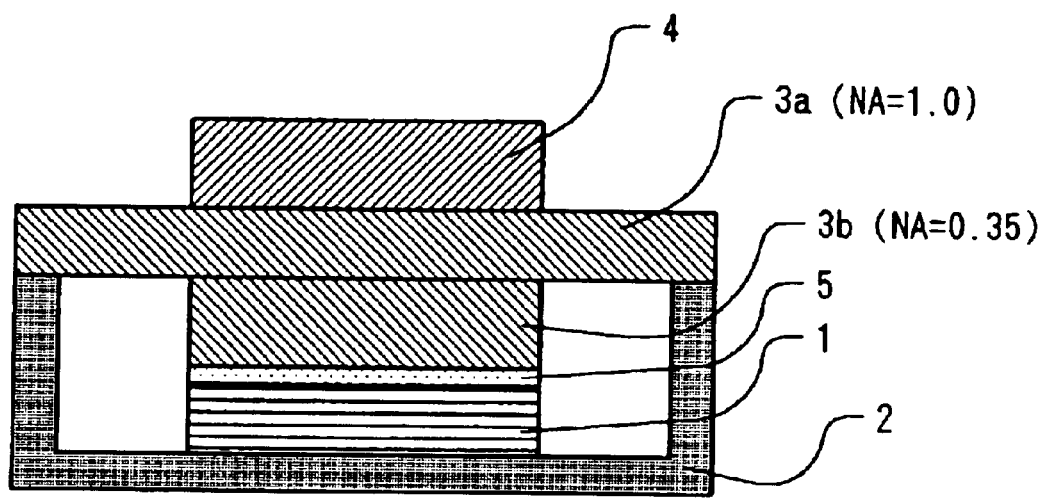
FIG. 8 is a schematic view illustrating the structure of a spectrophotometer according to a fourth embodiment of the present invention.

FIG. 8 is a schematic view illustrating the structure of a spectrophotometer according to a fourth embodiment of the present invention. As described above, in the embodiment illustrated in FIG. 1, the wavelength resolution can be increased if the numerical aperture (NA) of fiber optic plate is small, in particular, no more than 0.35. However, the diameter of fibers in the fiber optic plates with a numerical aperture of 0.35, which are presently marketed, is about 25 $\mu$m. This poses no serious problem when a linear sensor with a size of one pixel of about 50×2500 $\mu$m is used. However, pixels of the recent two-dimensional CCDs have been getting smaller from year to year and in most recent CCDs they are in the form of squares of about 15×15 $\mu$m. When such two-dimensional CCDs are employed to miniaturize the device, if fibers with the above-mentioned diameter are used, the outgoing light spreads over a plurality of elements and resolution decreases.

In the fourth embodiment, a fiber optic plate with a numerical aperture of 0.35 is used as the fiber optic plate 3a, and a fiber optic plate with a numerical aperture of 1 is used as the fiber optic plate 3b. As a result, the aperture angle is limited by the fiber optic plate 3a, and since the diameter of fibers in the fiber optic plate 3b which is adjacent to the linear sensor 1 is small, one fiber does not cover two pixels. This structure is especially effective when the Linear Variable Filter is large and the fiber optic plate is small.

On the other hand, when a linear sensor with a size of one pixel of about 50×2500 $\mu$m is used, the output from the Linear Variable Filter can be taken out upon breaking down into small components by using a fiber optic plate with a numerical aperture of 1.0 as the fiber optic plate 3a and using a fiber optic plate with a numerical aperture of 0.35 as the fiber optic plate 3b.

Figure 9:
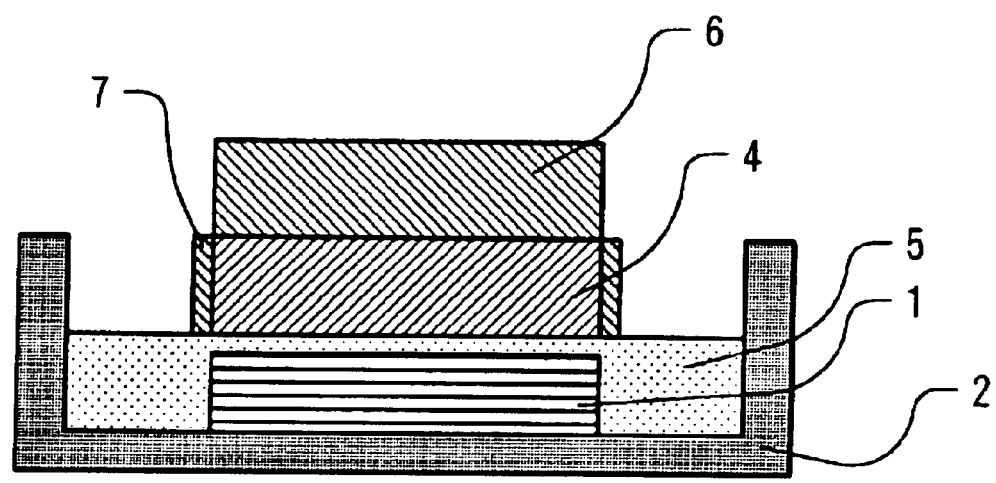
FIG. 9 is a schematic view illustrating the structure of a spectrophotometer according to a fifth embodiment of the present invention.

FIG. 9 is a schematic view illustrating the structure of a spectrophotometer according to a fifth embodiment of the present invention. In the fifth embodiment, the fiber optic plate 6 is placed above the Linear Variable Filter 4, and the Linear Variable Filter 4 is disposed in close proximity to the linear sensor 1 via a transparent resin 5. In this case, it is more difficult to conduct processing for decreasing the gap to about 0.01 mm than in the case when the fiber optic plate 3b is disposed in close proximity to linear sensor 1, as shown in FIG. 1. However, such a gap still can be realized, if the processing method is improved. In this case, because the fiber optic plate 6 is employed to limit the aperture angle, a numerical aperture of less than 1 is necessary and presently it is preferred that a fiber optic plate with a numerical aperture of no more than 0.35 be used.

In all of the above-described embodiments, the surface area of the Linear Variable Filter 4 was equal to that of linear sensor 1. Therefore, flat fiber optic plates 3a, 3b were used. However, in recent two-dimensional image sensors, the surface area decreases in a step-like manner. For this reason, flat fiber optic plates sometimes cannot be directly used in two-dimensional imaging sensors. In such cases, two-dimensional spectral measurements can be conducted if a tapered fiber optic plate is used.

Figure 10:
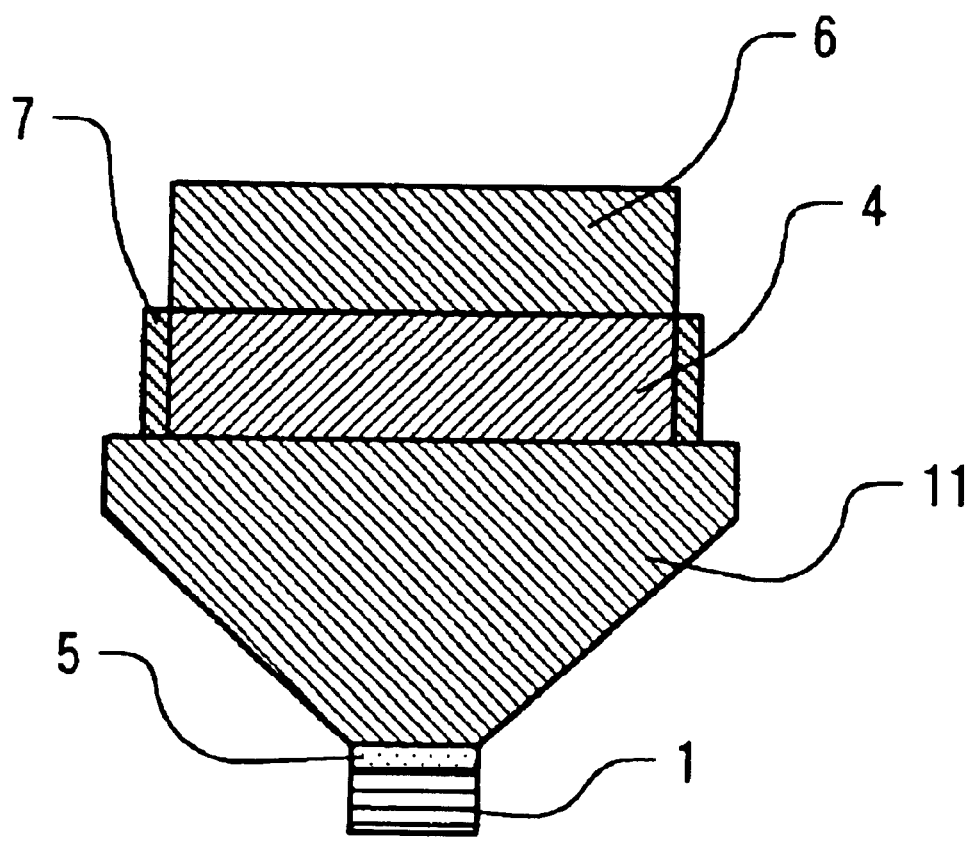
FIG. 10 is a schematic view illustrating the structure of a spectrophotometer according to a sixth embodiment of the present invention.
Figure 13:
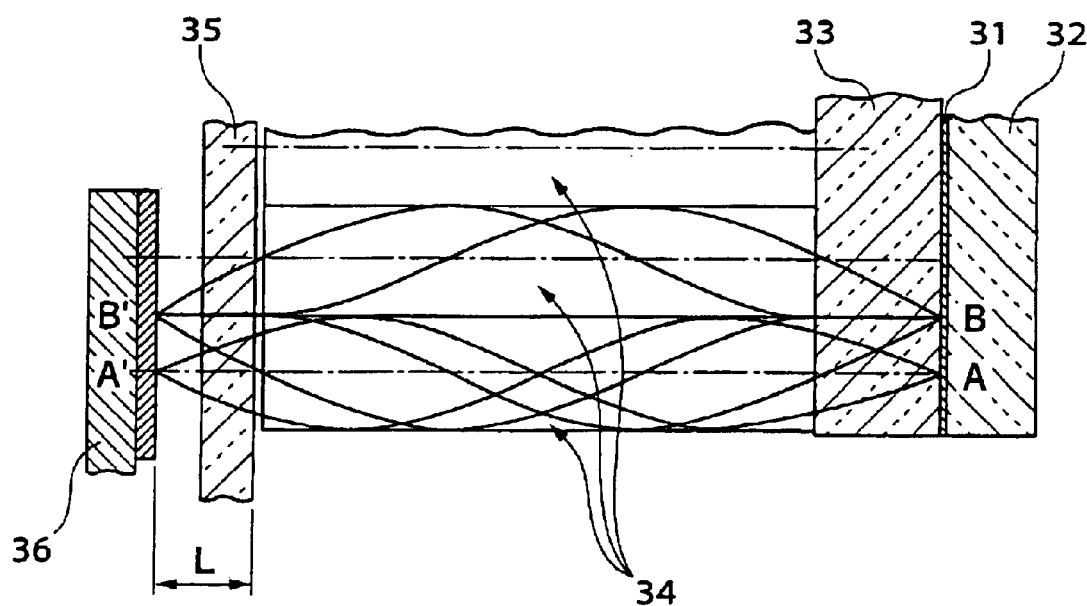
FIG. 13 illustrates the structure of a conventional spectrophotometer using a Linear Variable Filter and a GRIN lens.
Figure 14:
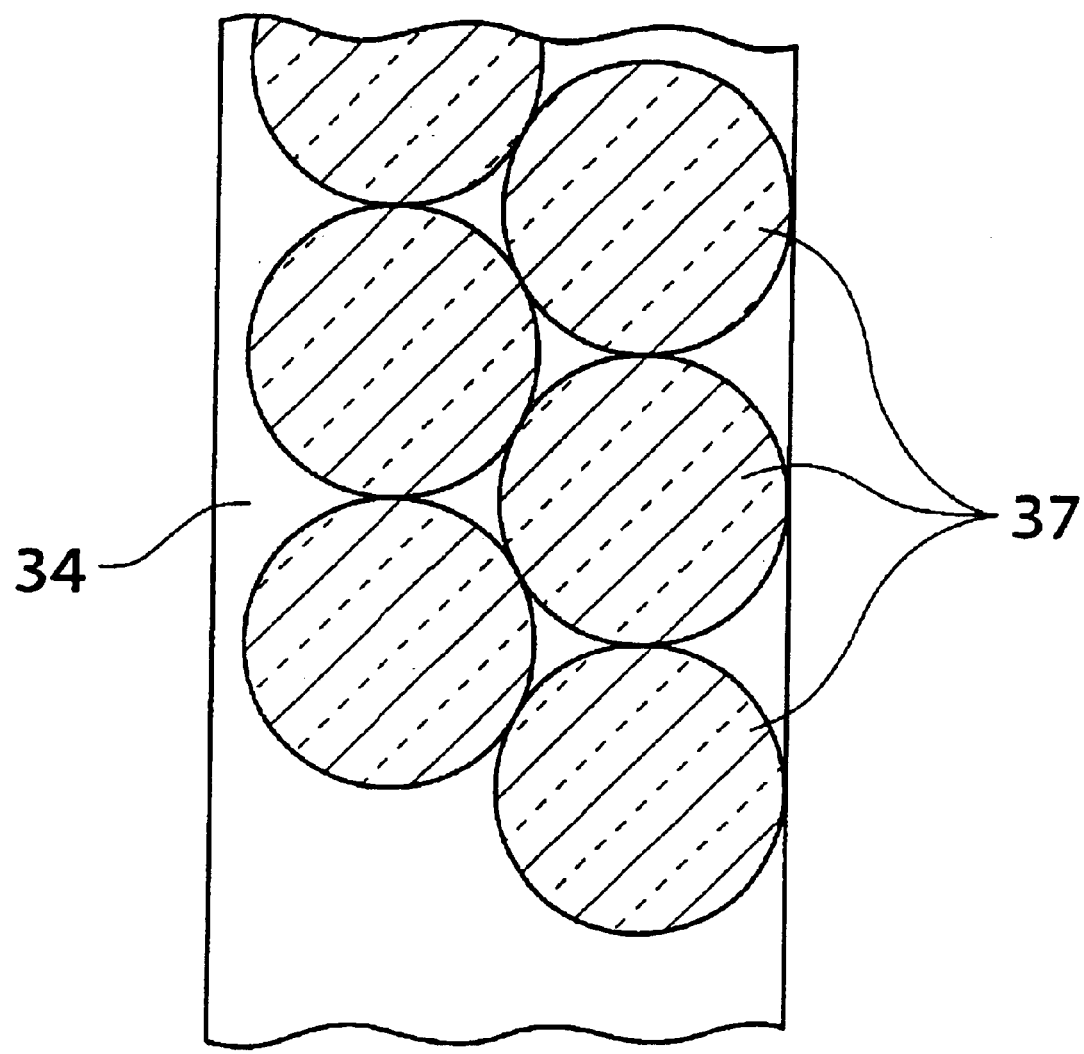
FIG. 14 illustrates the structure of a GRIN lens.

FIG. 10 is a schematic view illustrating the structure of a spectrophotometer according to a sixth embodiment of the present invention. A fiber optic plate 6 is disposed on the upper surface of Linear Variable Filter 4 in intimate contact therewith and the aperture angle is limited. The numerical aperture of fiber optic plate 6 is no more than 1.0, and preferably, no more than 0.35. A large-area surface of a tapered fiber optic plate 11 is in intimate contact with the other surface of Linear Variable Filter 4. A small-area surface of tapered fiber optic plate 11 faces the linear sensor 1 at a distance of about 0.01 mm therefrom, with a transparent resin 5 provided therebetween.

A multiple-sheet Linear Variable Filter 4 may be attached to the larger surface of tapered fiber optic plate 11, and a smaller surface thereof may be disposed in close proximity to the two-dimensional imaging sensor. As a result, two-dimensional spectral measurements can be conducted. Providing an antireflection film 7 on the side surface of Linear Variable Filter 4 can prevent, as described above, the decrease of wavelength resolution in the end portion of linear sensor or two-dimensional imaging sensor.

It is noted that the anti-reflection film 7 is shown only in the embodiments of the present invention illustrated in FIGS. 6, 9 and 10. However, the anti-reflection film 7 can be provided in all of the embodiments. Furthermore, in all of the embodiments, a two-dimensional imaging sensor can be used in place of the linear sensor.

In the above-described embodiments, moreover, an example relating to a visual range is shown. However, the present invention can also be used in optical sensors for UV, near-IR, and IR ranges. That is to say, one-dimensional and two-dimensional spectral sensors for these wavelength range can be realized by selecting and assembling components of the Linear Variable Filter, fiber optic plate, and semiconductor sensor with matching wavelength regions, in the same manner as in the visual range.

As described above, according to the present invention, light can be received and photoelectrically converted by a linear sensor or a two-dimensional image sensor in a state with increased quantity of incident light and the electric signals can be processed with a signal processor, while a high wavelength resolution of the Linear Variable Filter is being maintained. Therefore, the spectral sensor unit can be miniaturized significantly by comparison with conventional units, and the increase in light transfer ratio allows for fast measurements with a period of about 1 msec.

One example of a fast measurement application is an apparatus for online implementation of color measurements in color printing. In gravure printing, changes in color have to be monitored. Accordingly, color marks called color patches, whose number is equal to the number of inks, are attached and color changes are visually monitored after printing. Color patches in the form of rectangles of about 6×8 mm are typically used. When the line speed is 200 m/min, a section of 3.3 mm is transported in 1 msec. Thus, the 1 msec scanning period achieved by the present invention makes it possible to conduct online spectral measurements and detect color changes of color patches in an online mode that were impossible using conventional measurements with a period of 10 msec. Therefore, the present invention makes a significant contribution to the increase of production yield.

Until now, conventional spectral apparatus have been large, expensive and unsuitable for online measurement. Spectral measurements using a Linear Variable Filter have been an effective means for overcoming this drawback, but their history has been brief and there has been no effective optical system provided therefor.

The present invention realizes an optical system employing the specific features of Linear Variable Filters in order to achieve inexpensive, compact and lightweight spectral sensors using no mechanical drives and having a fast response and a high wavelength resolution which will find extensive practical applications.

What is claimed is:

1. A spectrophotometer comprising:

a Linear Variable Filter;

one of a linear sensor and a two-dimensional image sensor;

at least one fiber optic plate that is disposed between the Linear Variable Filter and the one of the linear sensor and the two-dimensional image sensor, and that transfers light separated into spectral components outgoing from the Linear Variable Filter to the one of the linear sensor and the two-dimensional image sensor; and an additional fiber optic plate provided in contact with an incidence side of the Linear Variable Filter, wherein the additional fiber optic plate has a numerical aperture of less than 1.

2. The spectrophotometer according to claim 1, wherein the numerical aperture of the additional fiber optic plate is no more than 0.35.

3. A spectrophotometer comprising:

a Linear Variable Filter;

one of a linear sensor and a two-dimensional image sensor; and at least one fiber optic plate that is disposed between the Linear Variable Filter and the one of the linear sensor and the two-dimensional image sensor, and that transfers light separated into spectral components outgoing from the Linear Variable Filter to the one of the linear sensor and the two-dimensional image sensor;

wherein the at least one fiber optic plate comprises a first fiber optic plate with a numerical aperture of 1.0 and a second fiber optic plate with a numerical aperture of no more than 0.35, and wherein the first and second fiber optic plates are in contact with each other.

4. A spectrophotometer comprising:

a Linear Variable Filter;

one of a linear sensor and a two-dimensional image sensor; and at least one fiber optic plate that is disposed between the Linear Variable Filter and the one of the linear sensor and the two-dimensional image sensor, and that transfers light separated into spectral components outgoing from the Linear Variable Filter to the one of the linear sensor and the two-dimensional image sensor;

wherein an anti-reflection film coated with an absorbing agent is provided on at least one side surface of the Linear Variable Filter.

5. A spectrophotometer comprising:

a Linear Variable Filter disposed in close proximity to one of a linear sensor and a two-dimensional image sensor via a transparent resin; and a fiber optic plate disposed on the Linear Variable Filter;

wherein a numerical aperture of the fiber optic plate is no more than 1.0; and wherein an anti-reflection film coated with an absorbing agent is provided on at least one side surface of the Linear Variable Filter.

* * * * *